United States Patent
Sapp et al.

(10) Patent No.: US 10,607,254 B1
(45) Date of Patent: Mar. 31, 2020

(54) ATTRIBUTION MODELING USING WITHHELD OR NEAR IMPRESSIONS

(71) Applicant: Google Inc., Mountain View, CA (US)

(72) Inventors: Stephanie Sapp, Boulder, CO (US); Stefan F. Schnabl, San Francisco, CA (US); Jon Vaver, Lafayette, CO (US); Ruixue Fan, Great Neck, NY (US)

(73) Assignee: Google LLC, Mountain View, CA (US)

( * ) Notice: Subject to any disclaimer, the term of this patent is extended or adjusted under 35 U.S.C. 154(b) by 1081 days.

(21) Appl. No.: 15/044,923

(22) Filed: Feb. 16, 2016

(51) Int. Cl.
*G06Q 30/02* (2012.01)

(52) U.S. Cl.
CPC ..... *G06Q 30/0246* (2013.01); *G06Q 30/0239* (2013.01); *G06Q 30/0243* (2013.01); *G06Q 30/0275* (2013.01); *G06Q 30/0277* (2013.01)

(58) Field of Classification Search
CPC ........................................ G06Q 30/0207–0277
See application file for complete search history.

(56) References Cited

U.S. PATENT DOCUMENTS

| | | | |
|---|---|---|---|
| 8,386,475 B2 | 2/2013 | Green et al. | |
| 8,977,584 B2 * | 3/2015 | Jerram | G06Q 30/02 706/46 |
| 9,037,483 B1 | 5/2015 | Curcio et al. | |
| 9,875,484 B1 * | 1/2018 | Schnabl | G06Q 30/0242 |
| 10,387,921 B1 * | 8/2019 | Lewis | G06Q 30/0275 |
| 2003/0171990 A1 | 9/2003 | Rao et al. | |
| 2006/0212350 A1 | 9/2006 | Ellis et al. | |
| 2008/0103971 A1 * | 5/2008 | Lukose | G06Q 20/10 705/40 |
| 2010/0306043 A1 * | 12/2010 | Lindsay | G06Q 30/02 705/14.41 |
| 2011/0231243 A1 * | 9/2011 | Bhatia | G06Q 30/02 705/14.43 |
| 2011/0246267 A1 * | 10/2011 | Williams | G06Q 30/02 705/14.4 |
| 2011/0302025 A1 * | 12/2011 | Hsiao | G06Q 30/02 705/14.42 |

(Continued)

FOREIGN PATENT DOCUMENTS

WO    WO-2013/116105 A1    8/2013

OTHER PUBLICATIONS

Predicting Online Purchase Conversion Using Web Path Analysis, Montgomery et al., Nov. 2002.*

(Continued)

*Primary Examiner* — David J Stoltenberg
(74) *Attorney, Agent, or Firm* — Foley & Lardner LLP

(57) ABSTRACT

Systems, methods, and computer-readable storage media for attribution modeling using withheld or near impression data are provided. One method involves determining, for a first content item impression, withheld or near impressions for a competing content item within a content auction. The method further involves identifying a first set of paths including a sequence of events that includes an interaction with the first content item impression. The method further involves identifying a second set of paths, each including the sequence of events with the competing content item impression replacing the first content item impression. The method compares conversion metrics for the first and second paths to determine attribution credit for the first content item impression.

20 Claims, 8 Drawing Sheets

(56) References Cited

U.S. PATENT DOCUMENTS

| | | | |
|---|---|---|---|
| 2011/0307320 A1* | 12/2011 | Tangney | G06Q 30/02 705/14.41 |
| 2011/0307321 A1* | 12/2011 | Tangney | G06Q 30/02 705/14.41 |
| 2011/0307322 A1* | 12/2011 | Hsiao | G06Q 30/02 705/14.41 |
| 2011/0307324 A1* | 12/2011 | Hsiao | G06Q 30/02 705/14.42 |
| 2011/0307325 A1* | 12/2011 | Hsiao | G06Q 30/02 705/14.42 |
| 2011/0307326 A1* | 12/2011 | Hsiao | G06Q 30/02 705/14.42 |
| 2011/0307330 A1* | 12/2011 | Hsiao | G06Q 30/02 705/14.45 |
| 2011/0307509 A1* | 12/2011 | Hsiao | G06Q 30/02 707/769 |
| 2011/0307515 A1* | 12/2011 | Chen | G06Q 30/02 707/770 |
| 2012/0259841 A1* | 10/2012 | Hsiao | G06Q 30/0277 707/722 |
| 2012/0259851 A1* | 10/2012 | Jia | G06Q 30/0242 707/737 |
| 2012/0259854 A1* | 10/2012 | Hsiao | G06F 16/958 707/739 |
| 2012/0259871 A1* | 10/2012 | Holmes | G06Q 30/0242 707/753 |
| 2012/0260185 A1* | 10/2012 | Choc | G06Q 30/0241 715/738 |
| 2012/0303447 A1* | 11/2012 | Hughes | G06Q 30/0255 705/14.46 |
| 2013/0021345 A1* | 1/2013 | Hsiao | G06Q 30/0241 345/440.2 |
| 2013/0030908 A1* | 1/2013 | Gessner | G06Q 30/0242 705/14.45 |
| 2013/0066706 A1* | 3/2013 | Wu | G06Q 30/0242 705/14.42 |
| 2013/0066711 A1* | 3/2013 | Liyanage | G06Q 50/01 705/14.43 |
| 2013/0085837 A1* | 4/2013 | Blume | G06Q 30/0241 705/14.41 |
| 2013/0085868 A1* | 4/2013 | Jordan | G06Q 30/0241 705/14.71 |
| 2013/0138503 A1* | 5/2013 | Brown | G06Q 30/0246 705/14.45 |
| 2013/0173382 A1* | 7/2013 | Hasson | G06Q 30/0242 705/14.45 |
| 2013/0204700 A1* | 8/2013 | Synett | G06N 5/02 705/14.53 |
| 2013/0231977 A1* | 9/2013 | Synett | G06N 5/02 705/7.35 |
| 2014/0006170 A1* | 1/2014 | Collette | G06Q 30/0277 705/14.71 |
| 2014/0095323 A1* | 4/2014 | Vassilvitskii | G06Q 30/0275 705/14.71 |
| 2014/0120864 A1* | 5/2014 | Manolarakis | H04W 24/08 455/405 |
| 2014/0379490 A1* | 12/2014 | Schnabl | G06Q 30/0244 705/14.71 |
| 2015/0007081 A1* | 1/2015 | Hsiao | G06Q 30/0241 715/771 |
| 2015/0178790 A1* | 6/2015 | Yi | G06Q 30/0275 705/7.31 |
| 2015/0220970 A1* | 8/2015 | Greenzeiger | G06Q 30/0244 705/14.43 |
| 2015/0332310 A1* | 11/2015 | Cui | G06Q 30/0244 705/14.45 |
| 2015/0363794 A1* | 12/2015 | Hoyne | G06Q 30/0201 705/7.29 |
| 2015/0379556 A1* | 12/2015 | Udassin | G06Q 30/0243 705/14.42 |
| 2016/0034948 A1* | 2/2016 | Zhong | G06Q 30/0246 705/14.45 |
| 2016/0050129 A1* | 2/2016 | Hoyne | H04L 43/08 709/224 |
| 2016/0055519 A1* | 2/2016 | Chittilappilly | G06Q 30/0244 705/14.43 |
| 2016/0063427 A1* | 3/2016 | Xu | G06Q 10/06398 705/7.42 |
| 2016/0155143 A1* | 6/2016 | Hsiao | G06Q 30/02 705/14.45 |
| 2016/0210656 A1* | 7/2016 | Chittilappilly | G06Q 30/0246 |
| 2016/0210659 A1* | 7/2016 | Chittilappilly | G06Q 30/0246 |
| 2016/0210661 A1* | 7/2016 | Chittilappilly | G06Q 30/0246 |
| 2017/0046734 A1* | 2/2017 | Chittilappilly | G06Q 30/0246 |
| 2017/0061467 A1* | 3/2017 | McHugh | G06Q 30/0242 |
| 2017/0213238 A1* | 7/2017 | Bhalgat | G06Q 30/0275 |
| 2019/0311407 A1* | 10/2019 | Li | G06Q 30/0275 |

OTHER PUBLICATIONS

Customer Journeys on Online Purchase: Search Engine, Social Media, and Third-Party Advertising, Duan et al., Pacific Asia Conference on Information Systems, 2014 Proceedings. 96.*

* cited by examiner

ATTRIBUTION MODELING USING WITHHELD OR NEAR IMPRESSIONS

BACKGROUND

Attribution modeling is the process of attributing value and/or conversions to the marketing events which may have influenced a user prior to converting. Conversions may be defined as any action an content provider (e.g., advertiser) desires a user to take. Attribution modeling uses observations of user-level marketing events and interactions with the content provider as input to approximate causal impact of specific content items. One problem in the field of attribution modeling is selecting activity stream data that will generate accurate estimations of a content item's (e.g., advertisement's) causal impact. Generally, content impressions and user interactions with the content provider (e.g., advertiser) are tracked by a system which includes logging user identifications in lists and maintenance of these lists.

SUMMARY

One illustrative implementation of the disclosure relates to a method that involves determining, by one or more processors, for a first content item impression, a competing content item that participated in a content auction in which the first content item was a participant, wherein the competing content item is of a first type withheld from presentation to users through the content auction or a second type within a threshold level from selection as a winning participant in the content auction. The method further involves identifying, by the one or more processors, a plurality of first paths including a sequence of events, the sequence of events including an interaction with the first content item impression. The method further involves identifying, by the one or more processors, a plurality of second paths, each of the plurality of second paths including the sequence of events with an interaction with an impression of the competing content item in place of the first content item impression in the sequence of events. The method further includes determining, by the one or more processors, a first conversion metric for the first paths and a second conversion metric for the second paths, comparing, by the one or more processors, the first conversion metric with the second conversion metric to determine an attribution credit for the first content item impression, and storing the determined attribution credit.

Another implementation of the disclosure relates to a system which includes operably coupled to at least one memory and configured to determine for a first content item impression, a competing content item that participated in a content auction in which the first content item was a participant, wherein the competing content item is of a first type withheld from presentation to users through the content auction or a second type within a threshold level from selection as a winning participant in the content auction. The at least one processor is further configured to identify a plurality of first paths including a sequence of events, the sequence of events including an interaction with the first content item impression. The at least one processor is further configured to identify a plurality of second paths, each of the plurality of second paths including the sequence of events with an interaction with an impression of the competing content item in place of the first content item impression in the sequence of events. The at least one processor is further configured to determine a first conversion metric for the first paths and a second conversion metric for the second paths, compare the first conversion metric with the second conversion metric to determine an attribution credit for the first content item impression, and store the determined attribution credit.

Yet another implementation of the disclosure relates to one or more computer-readable storage media having instructions stored thereon that, when executed by one or more processors, cause the one or more processors to execute operations including determining, by one or more processors, for a first content item impression, a competing content item that participated in a content auction in which the first content item was a participant, wherein the competing content item is of a first type withheld from presentation to users through the content auction or a second type within a threshold level from selection as a winning participant in the content auction. The operations further include identifying a plurality of first paths including the first content item impression at an index position within each of the first paths, each of the first paths including a sequence of events occurring prior to the index position. The operations further include identifying a plurality of second paths, each of the plurality of second paths including the sequence of events prior to the index position and including the competing content item impression at the index position. The operations further include determining, by the one or more processors, a first conversion metric for the first paths and a second conversion metric for the second paths, comparing the first conversion metric with the second conversion metric to determine an attribution credit for the first content item impression, and storing the determined attribution credit in association with the first paths including the sequence of events and the first content item impression.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
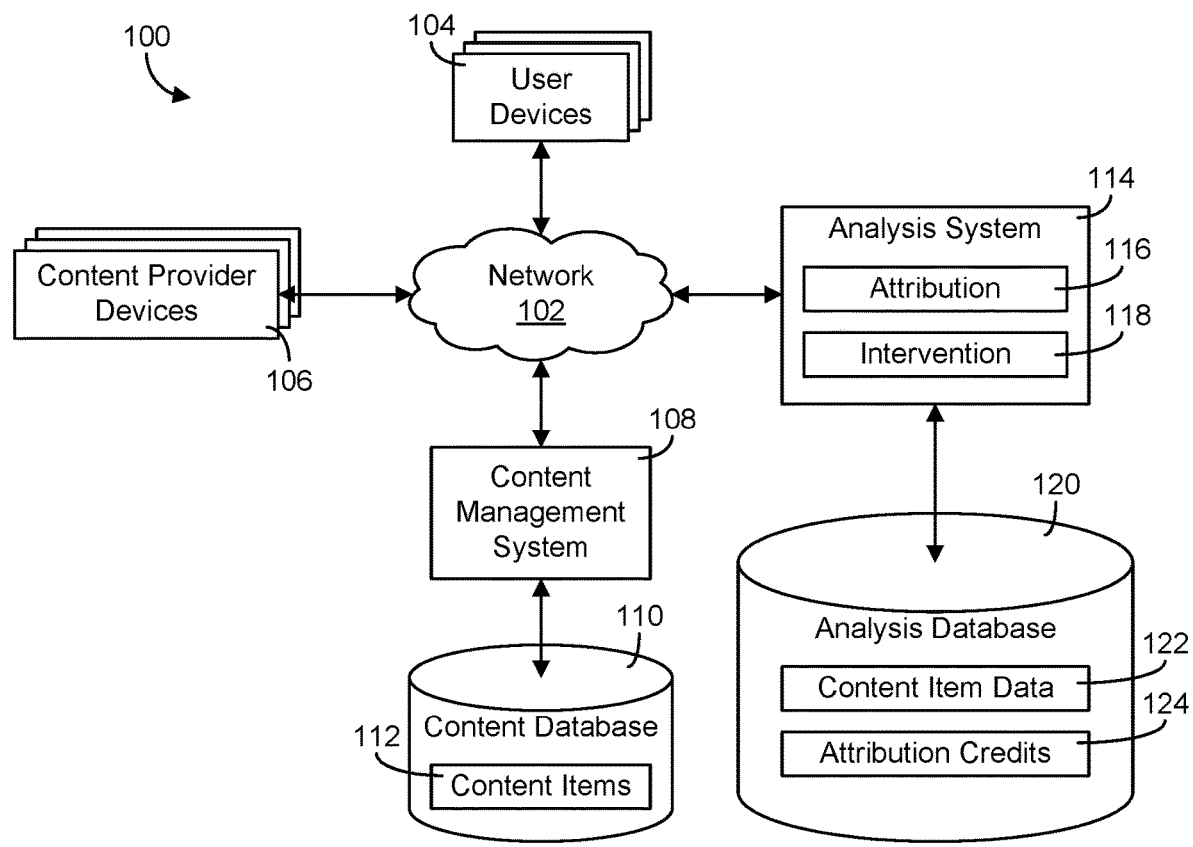
FIG. 1 is a block diagram of an analysis system and associated environment according to an illustrative implementation.

Referring generally to the Figures, various illustrative systems and methods are provided that may be used to provide content providers with information regarding how interactions with users impact each user's actions. The present disclosure relates to systems and methods for attributing value to marketing events using withheld or near impressions. Attribution modeling is the process of attributing value and/or conversions to the marketing events which influenced a user prior to converting. Conversions may be defined as any action an content provider desires a user to take. Attribution modeling uses user paths including observations of user-level marketing events and interactions with the content provider as input to approximate causal impact of specific content items. The systems and methods of the present disclosure may be used, for example, to adjust marketing budgets and efforts.

One problem in the field of attribution modeling is obtaining activity stream data that will generate accurate estimations of a content item's (e.g., advertisement's) causal impact. Generally, content impressions and user interactions with the content provider (e.g., advertiser) are tracked by a system which includes logging user identifications in lists and maintenance of these lists. The proposed solution is simpler to facilitate than previous solutions, and is shown provide more accurate attributions in simulation studies.

A method of determining conversion rates due to a content item is to compare the proportion of a set of people who saw the content item and converted to the proportion of the same set of people who did not see the content item and converted. A close approximation for the same set of people may be a different set of people who are also members of the content item's target group, or share characteristics/preferences/behavior with members of the content item's target group. The proposed solution uses withheld impressions, or impressions held back from being presented to a user, and/or near impressions, or impressions which were nearly shown to the user, to identify a set of people within or similar to the target audience of the content item.

The present disclosure details using content item impressions that were either actively held back from users (e.g., based on serving parameters of the withheld item, characteristics of the users, etc.) and a competing content item participating in the auction or placeholder item was instead presented, or content item impressions that nearly missed being delivered by the content item server (e.g., content items that were competitive in the auction, but lost to the competing item within the auction). Withheld impressions, or impressions actively held back from users, may be identified as any of a number of types of impressions. For example, an impression may be a withheld impression if a user to whom a content item was set to be presented to is on a negative remarketing list, or a do not contact list. An impression may be a withheld impression if a user has specifically requested not to be shown ads relating to the product or a product category. In some implementations, when conducting experiments, a content item impression may be held back from a certain portion of users or limited to a certain number of impressions. For example, the portion of users from whom the impression is withheld, or the particular impressions selected to be withheld, may be randomly selected by the analysis system. In some implementations, the randomization can occur at each content item serving opportunity (e.g., if the impression can be served to or withheld from the same user multiple times, the determination of whether the user is provided the item or not may be randomized at each opportunity).

Near impressions, or impressions that nearly missed being delivered by the content item server, may be identified as any of a number of types of impressions. For example, an impression may be a near impression if the advertising impression was part of a content item auction in which a competing content item was a winning participant, and the near impression did not win by some amount. The impression may have missed winning the auction by a threshold bid amount, such as a dollar amount. In some implementations, the impression may have missed winning the auction by a threshold amount of places. For example, the impression may have been the third content item in line after the winning content item. In some implementations, users exposed to near impressions may share similarities with users exposed to the competing content item impressions that were selected as winning items.

The proposed attribution modeling methods, according to various illustrative implementations, use content item impressions that were either actively withheld from users, or content item impressions that missed being delivered by the content item server, where a competing content item was a winning item presented to a user. The method may access information regarding how close the impressions were to being served. In some implementations, the attribution model used may be an upstream data driven attribution model which computes attributed conversions of a particular competing marketing event by comparing conversion metrics for test paths that have the same sequence of marketing events upstream of a targeted marketing event as matching sets of control paths. The model may identify control paths as matching if they substitute an unrealized marketing event (i.e., a withheld impression or near impression) in the same position as the competing content item impression that won the auction and was presented to a user. In some implementations (e.g., implementations that utilize an upstream data driven attribution (DDA) model), the events downstream of the targeted marketing event are not considered, as all downstream behavior of a user may be affected by the targeted marketing event. It should be appreciated that upstream DDA is provided as one example of an attribution model that can be used in conjunction with the present disclosure; in other implementations, any other type of attribution model may be used in conjunction with the features described herein.

Case paths are identified that include a sequence of events and an interaction with the content item impression to be analyzed. In some implementations (e.g., utilizing upstream DDA), case paths are generated from paths containing the content item impression being analyzed by removing all events (except conversions) following the analyzed content item impression (e.g., all events following the first instance of the impression in the path or events following each instance of the impression). Control paths are identified that include the sequence of events but replace the analyzed content item impression with a competing impression that was a withheld or near impression from one or more auction(s) in which the analyzed item and competing items competed for presentation to users. In some implementations, control paths are restricted to not include the analyzed content item impression. For each unique case path, a set of matching control paths is found, and the difference in conversion rate is calculated. A matching control path has a set of upstream marketing events which correspond to the upstream marketing events of the case path. The control path replaces the targeted marketing event with a withheld impression or near impression. In some implementations, a set of control paths may be determined to match even if they do not include exactly the same set of upstream events. For example, in some implementations, a function may be applied to the events (e.g., upstream events) in a path considered for a control path, and the function may generate a metric indicating a similarity between the events and the events (e.g., upstream events) in the relevant case path. If the metric is above a threshold, the path may be considered a matching control path for the case path.

Attribution credits are calculated for each test path by comparing the conversion metrics (e.g., ratios, rates, averages, weighted averages, etc., as discussed below in further detail) of case paths with matching control paths. This solution may reduce estimation bias by matching paths based on upstream events, and the potential for exposure to the analyzed content item impression. Additionally, in some implementations, the method does not require that user identification be actively accessed by the content management system that serves the content item impressions, as the active withholding of content item impressions, or the logging of near impressions, happens per impression. This method improves marketing events activity stream data and provides results on an ongoing basis.

Simulations show that attribution results are improved across different levels of content item effectiveness, types of content item impact on user behavior, and different types of users. The improvements hold even in the presence of targeting particular types of users. Model results and captured data may be fed back into content item products and/or further drive marketing strategy and/or budget allocation.

Upstream DDA algorithms compute attributed conversions of a target event (e.g. a display or video content item impression) by comparing the conversion rates of paths that have the same events upstream of, or prior to, a content item impression being analyzed. The downstream events, or events following the target event, may not be considered in the path matching process because downstream events could be affected by the analyzed impression. Using only upstream paths reduces the estimation bias.

Referring now to FIG. 1, and in brief overview, a block diagram of an analysis system 114 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content from which content management system 108 selects items may be provided by one or more content providers via network 102 using one or more content provider devices 106.

In some implementations, bids for content to be selected by content management system 108 may be provided to content management system 108 from content providers participating in an auction using devices, such as content provider devices 106, configured to communicate with content management system 108 through network 102. In such implementations, content management system 108 may determine content to be published in one or more content interfaces of resources (e.g., webpages, applications, etc.) shown on user devices 104 based at least in part on the bids.

An analysis system 114 may be configured to analyze data relating to interactions of one or more users of user devices 104 with content items 112 and estimate an impact of the interactions on the conversion rate of each user. Analysis system 114 may generate an attribution credit for an analyzed event occurring within paths. While various implementations discussed below discuss the analyzed event in terms of interaction with a content item impression, the interaction may be of any form, such as viewing the impression, clicking through the impression, etc. Analysis system 114 may use attribution models, such as upstream DDA models, to generate the attribution credits. In some implementations, the models use content items such as withheld impressions or near impressions. Withheld impressions may be impressions held back from being presented to a user, where a competing content item in the auction (the content item associated with the impression being analyzed) was instead provided to the user. For example, a withheld impression may be a content item purposefully held back from being presented through a content auction. In some implementations, a content item may be selected as a winning participant in an auction, but before an impression of the content item is shown, the content management system determines whether to suppress the impression. For example, in some implementations, a random number generator may determine if the impression is shown or suppressed. In some implementations, the suppression may be performed to prevent the item from being shown more than a desired amount of times within a time period (e.g., to avoid exceeding a budget). If the content management system determines the impression should be suppressed, a second content item may be selected in place of the withdrawn item, or the auction may be re-run without the participation of the suppressed content item. In some implementations, the content management system may determine (e.g., using a random number generator) whether the original content item should be replaced with a completely unrelated content item, such as a public service content item. Various other implementations withdrawing a content item from being shown through an auction process may be utilized without departing from the scope of the present disclosure. Near impressions may be impressions which were nearly shown to the user, but lost in favor of a competing content item in the auction (the content item associated with the impression being analyzed). For example, a near impression may be a content item which was competitive in an auction, but missed winning by one slot.

Referring still to FIG. 1, and in greater detail, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 and/or content provider devices 106 may be configured to receive data from various sources using a network 102. In some implementations, network 102 may comprise a computing network (e.g., LAN, WAN, Internet, etc.) to which user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to conduct a content auction among third-party content providers to determine which third-party content is to be provided to a user device 104. For example, content management system 108 may conduct a real-time content auction in response to a user device 104 requesting first-party content from a content source (e.g., a website, search engine provider, etc.) or executing a first-party application. Content management system 108 may use any number of factors to determine the winner of the auction. For example, the winner of a content auction may be based in part on the third-party content provider's bid and/or a quality score for the third-party provider's content (e.g., a measure of how likely the user of the user device 104 is to click on the content). In other words, the highest bidder is not necessarily the winner of a content auction conducted by content management system 108, in some implementations.

Content management system 108 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at user devices 104. In some implementations, the bid amount may be on a cost per impression or cost per thousand impressions (CPM) basis. In further implementations, a bid amount may correspond to a specified action being performed in response to the third-party content being presented at a user device 104. For example, a bid amount may be a monetary amount that the third-party content provider is willing to pay, should their content be clicked on at the client device, thereby redirecting the client device to the provider's webpage or another resource associated with the content provider. In other words, a bid amount may be a cost per click (CPC) bid amount. In another example, the bid amount may correspond to an action being performed on the third-party provider's website, such as the user of the user device 104 making a purchase. Such bids are typically referred to as being on a cost per acquisition (CPA) or cost per conversion basis.

A campaign created via content management system 108 may also include selection parameters that control when a bid is placed on behalf of a third-party content provider in a content auction. If the third-party content is to be presented in conjunction with search results from a search engine, for example, the selection parameters may include one or more sets of search keywords. For instance, the third-party content provider may only participate in content auctions in which a search query for "golf resorts in California" is sent to a search engine. Other illustrative parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, content provider selling golf equipment may specify that they wish to place a content item (e.g., advertisement) on the sports page of an particular online newspaper.

Content management system 108 may also be configured to suggest a bid amount to a third-party content provider when a campaign is created or modified. In some implementations, the suggested bid amount may be based on aggregate bid amounts from the third-party content provider's peers (e.g., other third-party content providers that use the same or similar selection parameters as part of their campaigns). For example, a third-party content provider that wishes to place a content item on the sports page of an online newspaper may be shown an average bid amount used by other content provider on the same page. The suggested bid amount may facilitate the creation of bid amounts across different types of client devices, in some cases. In some implementations, the suggested bid amount may be sent to a third-party content provider as a suggested bid adjustment value. Such an adjustment value may be a suggested modification to an existing bid amount for one type of device, to enter a bid amount for another type of device as part of the same campaign. For example, content management system 108 may suggest that a third-party content provider increase or decrease their bid amount for desktop devices by a certain percentage, to create a bid amount for mobile devices.

Analysis system 114 may be configured to analyze data relating to user interactions with one or more items, such as resources (e.g., webpages, applications, etc.) associated with a content provider and/or paid or unpaid content items displayed within an interface in a resource (e.g., a search engine interface), and estimate an impact of one or more interactions on the predicted future revenue associated with customer relationships. Analysis system 114 may include one or more processors (e.g., any general purpose or special purpose processor), and may include and/or be operably coupled to one or more memories (e.g., any computer-readable storage media, such as a magnetic storage, optical storage, flash storage, RAM, etc.). In various implementations, analysis system 114 and content management system 108 may be implemented as separate systems or integrated within a single system (e.g., content management system 108 may be configured to incorporate some or all of the functions/capabilities of analysis system 114).

Analysis system 114 may include one or more modules (e.g., implemented as computer-readable instructions executable by a processor) configured to perform various functions of analysis system 114. Analysis system 114 may include an attribution module 116 configured to determine an attribution credit for a particular event, such as interaction with a particular content item impression. Attribution module 116 may receive content item data and generate attribution credits for each target content item impression using attribution models such as upstream DDA models.

Analysis system 114 may include an intervention module 118 configured to implement one or more actions in response to generated attribution credit values. In some implementations, intervention module 120 may be configured to cause content management system 108 to modify a bid for displaying one or more content items based on attribution credit values, such as those generated by attribution module 116. For example, intervention module 118 may increase a bid to present a content item to a user to increase a number of interactions with the content item in response to determining the attribution credit for that content item is high. While the systems and methods of the present disclosure are described in terms of an upstream DDA model, any type of attribution model designed to attribute credit for conversions to one or more events along a path of interactions may be used in various implementations, and the use of any attribution model is contemplated within the scope of the present disclosure.

System 100 may include an analysis database 120. Analysis database 120 is shown to include content item data 122 and attribution credits 124. Analysis database 120 may include other stored parameters or characteristics, and is not limited to the items shown in FIG. 1. Content item data 122 may be stored in analysis database 120 by content management system 108 and/or analysis system 114. Attribution credits 124 may be stored in analysis database 120 by attribution module 116. In some implementations, attribution credits 124 are the output of attribution module 116. In some implementations, a prediction model used may produce other values such as customer or user attributes, which may be stored in analysis database 120 and/or content database 110. For example, attributes such as mean lifetime value, mean transaction value, etc. may be stored as user attributes. Stored data structures in analysis database 120 may be used in further analysis by analysis system 114 or any of its modules.

Figure 2:
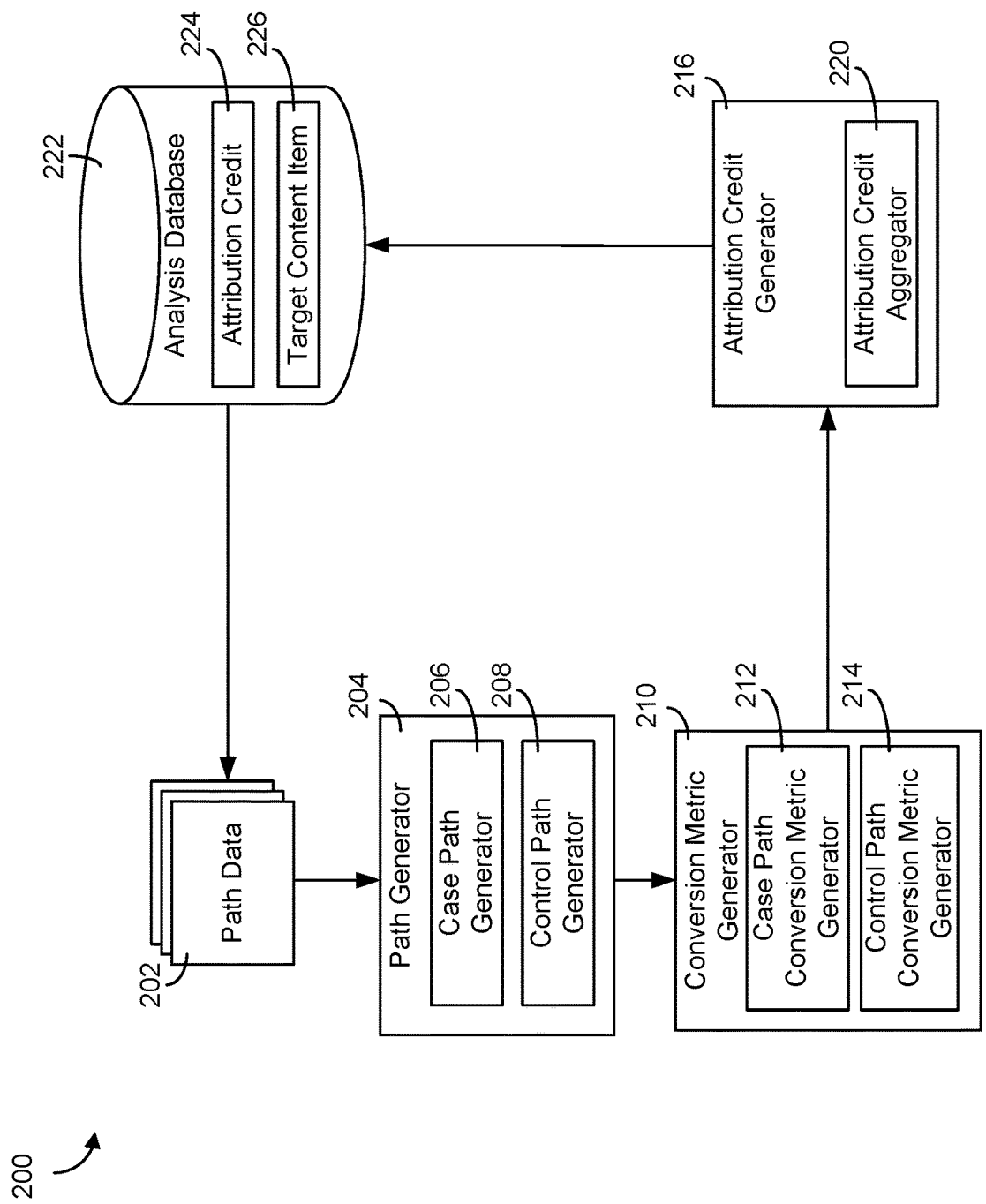
FIG. 2 is a block diagram of the analysis system and analysis database of FIG. 1 in detail according to an illustrative implementation.

Referring now to FIG. 2, and in brief overview, a block diagram of an analysis system 200 is shown according to an illustrative implementation. Analysis system 200 may be an implementation of analysis system 114 of FIG. 1. Analysis system 200 may be configured to receive path data 202 indicating one or more previous interactions of a user with one or more content items of a content campaign. The content campaign may include one or more content items that the content provider wishes to have presented to user devices 104 by content management system 108. In some implementations, each of the content items may have one or more products and/or services associated with the content item. In some implementations, each content item may be designed to promote one or more particular products and/or services. In some implementations, some content items may be configured to promote the content provider, an affiliate of the content provider, a resource (e.g., website) of the content provider, etc. in general, and the products and/or services associated with the content item may be any products and/or services offered for sale through the content provider, affiliate, resource, etc.

Path data 202 may include any type of data from which information about previous interactions of a user with a content campaign can be determined. The interactions may be instances where impressions of a campaign content item have been displayed on the user device of the user, instances where the user clicked through or otherwise selected the content item, instances where the user converted (e.g., purchased a product/service as a direct or indirect result of an interaction with a campaign content item, provided requested information to the content provider, or took some other action specified by the content provider), etc. In some implementations, path data 202 may include resource visitation data collected by analysis system 200 describing some or all activities leading to a website or other resource of the content provider. Analysis system 200 may collect information relating to a portion of the resource visited/accessed, an identifier associated with the user or user device that accessed the resource (e.g., a browser cookie, a unique device identifier, such as a serial number, a device fingerprint, such as a collection of non-private characteristics of the user device, or another type of identifier), information relating to an origin or previous location that the user/device last visited before accessing the resource, information relating to a trigger that caused the user device (e.g., device browser application) to navigate to the resource (e.g., the user manually accessing the resource, such as by typing a URL in an address bar, a link associated with a content item selected on the user device causing the user device to navigate to the resource, etc.), and/or other information relating to the user interaction with the resource. In some implementations, path data 202 may include one or more keywords associated with content items through which the resource was accessed. Analysis system 200 may utilize the visitation data to identify instances of the user/device previously interacting with one or more content items of the content campaign. In some implementations, path data 202 may include result data associated with a resource visit or other user interaction with one or more content items of the content campaign. The result data may indicate whether the visit resulted in the purchase of one or more products or services, an identity of any products/services purchased, a value of any purchased products/services, etc. In some implementations, path data 202 may be configured to follow a path from a first user visit to the resource and/or interaction with a content item of the content campaign to one or more conversions resulting from visits/interactions.

Path data 202 may be received by analysis system 200 and provided to path generator 204. Path generator 204 may generate case paths and control paths to be used in the generation of attribution credits from the received path data. In some implementations, path data 202 is received as raw data, and may be organized into data structures for each content item, customer, etc. In other implementations, path generator 204 may read or retrieve path data 202 from a remote data storage system. Path generator 204 may read and record path data from/to analysis database 222, which may be an implementation of analysis database 120. In some implementations, content item data is not recorded in storage 222, and a pointer to the location of the content item data in the data structure may be stored.

Path generator 204 is shown to have a case path generator 206 and a control path generator 208, according to an illustrative implementation. Case path generator 206 may identify and/or generate case paths from content item data 202. Case paths may be paths, or sequences of events, of a user's interactions with content. For example, a case path may include a series of interactions in which a user is presented with a content item, the user navigates to an information page about a product featured in the content item, and then the user makes a purchase. In some implementations, case paths may be generated by identifying paths containing a an event to be analyzed, such as the display of a particular content item impression to a user, a click or other selection of the content item by a user, or other types of interactions. In some implementations, the case paths may be identified as paths including a sequence of events that includes an event to be analyzed. In some implementations, case paths are generated by identifying paths including the analyzed event and removing one or more events from the paths that occur after the analyzed event. For example, in some implementations, case paths are generated by removing all events occurring after the analyed event except conversion events.

Control path generator 208 may identify and/or generate control paths from content item data 202. In some implementations, control paths may be generated for each type of case path (e.g., each set of case paths including a same or similar sequence of events) by identifying paths that contain a same sequence of events but, in place of the analyzed event, include an interaction with a competing content item impression, such as an impression of a competing content item that was either withheld from presentation in an auction in which the analyzed item was selected as a winning item or narrowly lost to the analyzed item. Specifically, in some implementations, the control paths may be paths having a same series of events as those leading up to an analyzed content item impression in the control path(s), but in which the analyzed content item impression is replaced with a withheld or near impression. In some implementations, interactions after the withheld/near impression in the control paths may be removed (e.g., all interactions except for conversions).

In some implementations, control path generator 208 may identify paths as matching control paths for a case path even if the sequence of events is not exactly the same. For example, in some implementations, a function may be applied to the events (e.g., upstream events) in a path considered for a control path, and the function may generate a metric indicating a similarity between the events and the events (e.g., upstream events) in the relevant case path. If the metric is above a threshold, the path may be considered a matching control path for the case path. In some such implementations, a path may be identified as a control path for a case path if it does not have the same events in the same sequence as the case path but at least a threshold number/percentage of the events are the same, event if they do not appear in the same order as in the case path.

Paths generated by path generator 204 may be received by conversion metric generator 210. Conversion metric generator 210 may generate conversion metrics for the paths generated by path generator 204. Conversion metrics may be generated separately for case paths and control paths. In some implementations, conversion metrics are generated for unique paths only. In other implementations, conversion metrics are generated for each path received by conversion metric generator 210. The generated conversion metrics may be passed to attribution credit generator 216. In some implementations, the number of paths associate with each calculated conversion metric is also retained.

The conversion metrics generated by conversion metric generator 210 may include any of a variety of metrics relating to an amount of conversions in the paths. For example, in various implementations, the conversion metrics may be: (1) ratios of a number of paths including a conversion versus a number of paths not including a conversion or a total number of paths; (2) a conversion rate (e.g., a percentage or number indicating a rate at which the paths result in conversions); or (3) an average or median number of conversions per path (e.g., reflecting paths that can include multiple conversions). Various other conversion metrics may be used in other implementations.

Conversion metric generator 210 is shown to have case path conversion metric generator 212 and control path conversion metric generator 214, according to an illustrative implementation. Case path conversion metric generator 212 may generate conversion metrics for each case path received by conversion metric generator 210. For example, case path conversion metric generator 212 may generate conversion metrics for case paths generated by case path generator 206. In some implementations, case path conversion metric generator 212 may generate conversion metrics by determining a rate at which a set of matching case paths (e.g., case paths having the same sequence of two or more events upstream of a analyzed event) ends in a conversion. For example, if 20 matching case paths were received by conversion metric generator 210, and 3 of the paths ended in a conversion, case path conversion metric generator 212 may generate a conversion metric of 0.15 for that particular case path. In some implementations, the utilized metric may account for paths including multiple conversions. For example, an average conversions per path metric may capture all conversions, including multiple conversions that occur within a single path.

Control path conversion metric generator 214 may generate conversion metrics for control paths received by conversion metric generator 210. For example, control path conversion metric generator 214 may generate conversion metrics for control paths generated by control path generator 208. In some implementations, control path conversion metric generator 214 may generate conversion metrics by determining a metric at which a set of matching control paths (e.g., paths having the same sequence of events that occurred before the analyzed event in the analyzed control paths and replace the analyzed event with a withheld/near impression, in some implementations of an upstream DDA attribution scheme) ends in a conversion. For example, if 20 matching control paths were received by conversion metric generator 210, and 3 of the paths ended in a conversion, control path conversion metric generator 214 may generate a conversion metric of 0.15 for the particular matching control paths.

Attribution credit generator 216 may generate attribution credits for each path generated by path generator 204. In some implementations, attribution credit generator 216 generates attribution credits for each type of path passed from conversion metric generator 210. In other implementations, attribution credit generator 216 may generate attribution credits for each pair of conversion metrics generated by conversion metric generator 210. For example, if there are three unique case paths, conversion metric generator 210 may pass along three pairs (case path and control path) of conversion metrics, and attribution credit generator 216 may generate attribution credits for each pair, representing matching paths, for a total of three attribution credit values. In some such implementations, each of the attribution credits may pertain to the same analyzed event (e.g., the same analyzed event appearing in conjunction with different combinations of preceding events). In some implementations, attribution credit generator 216 may determine the attribution credit for the analyzed event based on a difference between the conversion metrics for the case and control paths. For example, if the case path conversion metric is much higher than the control path conversion metric, the analyzed event may be assigned a high positive attribution credit, indicating the case path and control path information suggests the analyzed event may be highly responsible for driving the conversions. If the case path conversion metric is higher than the control path conversion metric, but not substantially higher, the attribution credit assigned to the analyzed event may be a smaller credit. If the case path conversion metric is much lower than the control path conversion metric, in some implementations, the attribution credit assigned to the analyzed event may be very small or may be a negative attribution value, indicating the appearance of the analyzed event in the paths may have dissuaded users from converting.

The attribution credits generated by attribution credit generator 216 may be stored in analysis database 222. In some implementations, the output of attribution credit generator 216 is transmitted to analysis database 222 for storage. For example, the attribution credits may be stored as attribution credit 224. In other implementations, the output of attribution credit generator 216 is transmitted to a remote storage. The output of attribution credit generator 216 may not be stored, and may instead be transmitted directly to a module for use in further analysis.

Attribution credit generator 216 is shown to include an attribution credit aggregator 220, according to an illustrative implementation. Attribution credit aggregator 220 may aggregate attribution credits for a analyzed event across multiple types of case paths including the analyzed event to determine an overall attribution credit for the analyzed event. For example, a particular analyzed event may be involved in five types of case paths, or paths having five different sequences of events preceding the analyzed event. For each type of case path, relevant control paths may be identified, and for each pair of case/control paths, an attribution credit for the analyzed event may be determined. Attribution credit aggregator 220 may then aggregate the determined attribution credits to determine an overall attribution credit. In some implementations, aggregation performed by attribution credit aggregator 220 is adding the attribution credits together (e.g., in some implementations where the attribution credit values are given a positive or negative sign depending on whether the control and case path analysis indicates they contributed to driving conversions or dissuaded the user from converting). In other implementations, methods such as finding an average, median, etc. may be applied to the individual attribution values to determine an overall attribution credit for the analyzed content item.

In some implementations, the attribution credit for an analyzed event may be a weighted average of the attribution credits for multiple case paths/sequences of events including the analyzed event. For example, a number of different case path types may be determined for the analyzed event, each including a different sequence of events including the analyzed event (analyzed interaction with a particular content item impression). A matching set of control paths may be determined for each case path, and conversion metrics may be determined for each pair of a case path type and the matching control paths. An attribution credit may be determined for each case path type based on a comparison of the case paths of that type and the matching control paths. A weighted aggregate attribution credit for the analyzed event may then be determined using a weighted combination of the individual attribution credits for the different case path types. In some implementations, the weighting may be performed based on a number of paths (e.g., case paths) associated with each case path type. For example, if a first case path type includes three case paths, a second case path type includes five case paths, and a third case path type includes eight case paths, an aggregate credit may be determined as follows, in one implementation:

Aggregate credit=(3/16)(P1Credit)+(5/16)(P2Credit)+ (8/16)(P3Credit)

In the illustrative equation above, P1Credit is the attribution credit for the case paths of the first type, P2Credit is the attribution credit for the case paths of the second type, and P3Credit is the attribution credit for the case paths of the third type.

Analysis database 222 is shown to include attribution credit 224 and analyzed content item 226, according to an illustrative implementation. For each matching set of case and control paths, an attribution credit 224 may be stored in analysis database 222. In some implementations, attribution credit 224 is stored as a scalar. In other implementations, attribution credit 224 may be stored as any form of data. In some implementations, attribution credit 224 contains outputs of attribution credit generator 216 and/or other modules of analysis system 114. In other implementations, attribution credit 224 contains only the attribution credits associated with the paths generated by path generator 204. In some implementations, attribution credit 224 includes the overall attribution credit for each analyzed content item 226 determined according to attribution credit aggregator 220.

Figure 3:
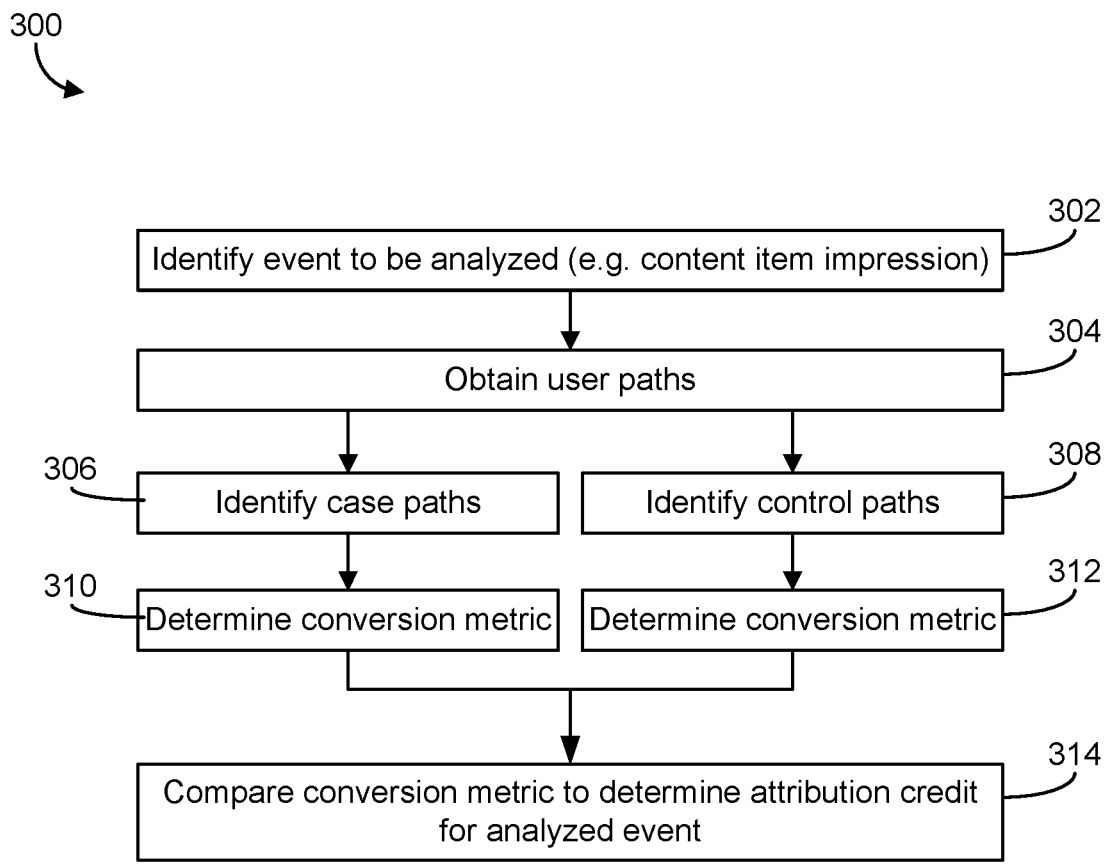
FIG. 3 is a flow diagram of a process for determining an attribution credit for a target event according to an illustrative implementation.

Referring now to FIG. 3, a process 300 for determining an attribution credit for an analyzed event is shown, according to an illustrative implementation. Process 300 may be performed by analysis system 114 and/or analysis system 200. An event to be analyzed is identified (302). In some implementations, the analyzed event may be a content item impression (e.g., a winning content item selected through an auction process). For example, the analyzed event may be a content item impression, such as a content item for a product, service, etc. In other implementations, the analyzed event may be any event, such as click or other type of interaction. In some implementations, the analyzed event may be a particular class or type of event, such as any event from a particular content item channel (e.g., display impressions, video impressions, etc.). In some implementations, the analyzed event may be a subset of impressions (e.g., display impressions) from one or more related campaigns (e.g., display impressions that share a common or similar creative). In some implementations where the analyzed events is a class or type of events, the case paths may be identified as those paths including an item that matches the class/type of event. The analyzed event may be identified by the content provider, or the analyzed event may be identified by analysis system 200. In some implementations, a content provider may designate a analyzed event through input to system 100, analysis system 114 and/or analysis system 200. For example, the content provider may select a new content item to be tested on users as the analyzed event by inputting the event to analysis system 200. In some implementations, content providers may provide input to analysis system 114 through content provider devices 106.

Analysis system 200 also obtains user paths (304). User paths contain sequences of events and actions related to users' interaction with content. In some implementations, each path is associated with one unique user. For example, each path may be associated with one user's actions during a specified time period. User paths may be obtained from content database 110 and/or network 102. In some implementations, user paths may be obtained from local or remote storage.

Analysis system 200 is configured to identify case paths from the received paths (306). Operation 306 may be performed by path generator 204 (e.g., case path generator 206) of system 200. In some implementations, case paths of a particular type may be identified by identifying paths that include a sequence of events including the analyzed event. In some implementations (e.g., using an upstream DDA attribution method), case paths may be generated by identifying paths that include a sequence of events at an index position earlier than an index position of the analyzed event within the paths. In some such implementations, one or more events after the index position of the analyzed event (e.g., events other than conversion events) may be discarded or removed from the paths to generate the case paths. A more detailed description of an illustrative process of case path generation is provided in the discussion of FIG. 4, according to one illustrative implementation.

Analysis system 200 also identifies control paths (308). Operation 308 may be performed by path generator 204 (e.g., control path generator 208) of system 200. For each case path type, one or more matching control paths may be identified that include a same or similar sequence of events as in the case path, but in which the analyzed event is replaced with an interaction with a competing content item impression that was a participant in an auction in which the analyzed content item participated and was selected as a winning item. In some implementations, the competing content item may be a withheld impression or near impression. In some implementations (e.g., utilizing an upstream DDA method), the control paths may be generated by identifying paths including the same or similar sequence of events as the relevant case paths and include a withdrawn/near impression instead of the analyzed content item impression and removing/discarding one or more events (e.g., events other than conversions) occurring after an index position of the withdrawn/near impression interaction. In some implementations, step 308 is performed in parallel with step 306. In other implementations, step 308 and 306 may be performed at separate times. Steps 308 and 306 may be arranged in any order, and are not limited to the order shown in this illustrative implementation. A more detailed description of an illustrative process of control path generation is provided in the discussion of FIG. 5.

Analysis system 200 determines conversion metrics for the case paths (310). Operation 310 may be performed by conversion metric generator 210 (e.g., case path conversion rate generator 212). In some implementations, conversion rates are determined by identifying, for a set of matching case paths (e.g., case paths having the same sequence of events preceding an analyzed event), a number of the case paths that end in a conversion. The number of matching case paths ending in a conversion may then be compared with the number of matching case paths that do not end in a conversion, or the total number of matching case paths, to generate a conversion rate for the matching case paths. Various other conversion metrics may be utilized in various implementations, as discussed in further detail above.

Analysis system 200 also determines conversion metrics for the control paths (312). Operation 312 may be performed by conversion metric generator 210 (e.g., case path conversion metric generator 212). In some implementations, conversion rates are generated for each type of control path (e.g., each type of control path having a matching sequence of events). In other implementations, conversion metrics are generated only for control paths corresponding to case paths (e.g., control paths including a same sequence of events as preceding an analyzed event in the control path). For example, if a control path does not correspond to any case paths, a conversion metric may not be generated for it. In some implementations, operation 312 is performed in parallel with step 310. In other implementations, step 312 and 310 may be performed at separate times. Steps 312 and 310 may be arranged in any order, and are not limited to the order shown in this illustrative implementation.

Process 300 continues with step 314, in which analysis system 200 compares the conversion metrics of case paths with the conversion metrics of control paths to determine an attribution credit for the analyzed event. Step 314 may be performed by attribution credit generator 216, path matcher 218, and/or attribution credit aggregator 220. Comparing the conversion metrics of case paths with those of control paths may include identifying matching paths. For example, analysis system 200 may compare the conversion rates of matching case and control paths. An illustrative process for identifying matching case and control paths and comparing conversion rates is discussed in more detail below.

In some implementations, multiple unique case and control paths are used to determine an attribution credit for a single analyzed event. In other implementations, one unique sequence of events (e.g., one path) is used to determine an attribution credit for a single analyzed event. In yet other implementations, one path may be used to determine an attribution credit for multiple analyzed events. In some implementations, the determined attribution credit is attributed to the particular case path or sequence of events including the analyzed event (e.g., such that the attribution credit is specific to the circumstances surrounding the interaction with the analyzed content item impression). The use of withheld or near impressions in the place of the analyzed event in the control paths reduces estimation bias in attribution modeling, as a population of users presented with a withheld or near impression is similar to a population of users presented with the analyzed event.

Figure 4:
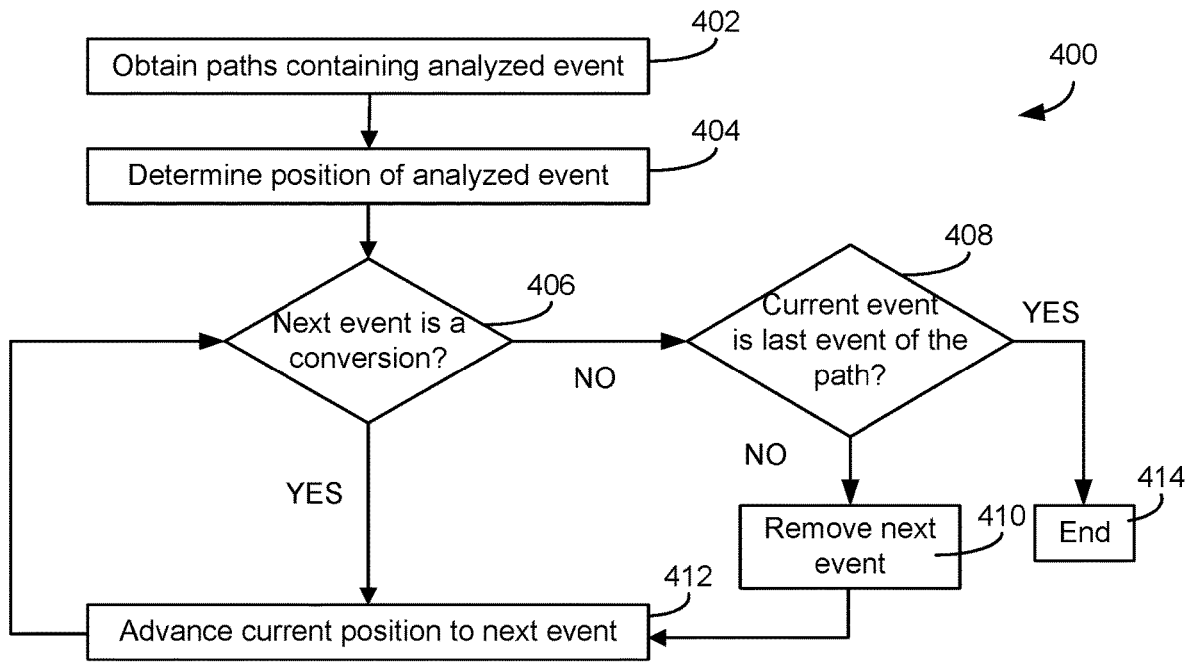
FIG. 4 is a flow diagram of a process for generating case paths of FIG. 3 according to an illustrative implementation.

Referring now to FIG. 4, a flow diagram of a process 400 for generating case paths is shown, according to an illustrative implementation. In some implementations, the process illustrated in FIG. 4 may be used in conjunction with an upstream DDA attribution model. Other processes may be utilized in other implementations and/or in conjunction with other models. For example, in some implementations, process 400 or a similar process could be applied for each instance of an analyzed event within each user path. Process 400 is provided solely for purposes of illustration. The case paths generated according to the process illustrated in FIG. 4 may be utilized by processes similar to the process shown in FIG. 3, in some implementations. In some implementations, process 400 may be performed by analysis system 114 and/or analysis system 200 (e.g., case path generator 206). Process 400 begins with operation 402, in which analysis system 200 obtains paths containing an analyzed event. In some implementations, the analyzed event is selected by a content provider and is provided to analysis system 200. In other implementations, the analyzed event is automatically selected by analysis system 200. The analyzed event may be randomly generated, chosen, etc.

Operation 402 may include receiving all available paths and looking at each path to determine whether the path contains the analyzed event. In some implementations, the paths may be pre-filtered to only include paths having the analyzed event. In other implementations, the paths may be sorted, stored in different locations in memory, etc. to separate the different types of paths.

Analysis system 200 determines the position of the the analyzed event (404). In some implementations, more than one analyzed event may be identified. For example, a user may wish to model the effects of consecutive events, staggered events, etc. In other implementations, one analyzed event is identified. Events of each path may have a sequential index position. In some implementations, the index position of each event is part of an identifier of the event in the path data structure. In other implementations, events in paths may be stored in ordered data structures such as linked lists. For example, consecutive events may be stored in doubly linked lists and an index position of the event may be maintained through the previous and next fields of each node, or event. In yet other implementations, events in paths may be stored in data structures such as a hash table with keys indicating the index position. Values corresponding to such keys may be the events, pointers to the events, etc. Events of each path may be stored and indexed in any way, and are not limited to those specifically enumerated.

Analysis system 200 determines whether the next event, the event having an index position sequentially after the current position, is a conversion event (406). The index may initially be set at the index position of the analyzed event in the path. In some implementations, a flag may indicate whether an event is a conversion event. In other implementations, a header, a key, etc., may indicate whether an event is a conversion event. If analysis system 200 determines that the next event is not a conversion event, process 400 continues with operation 408. If analysis system 200 determines that the next event is a conversion event, process 400 continues with operation 412.

In operation 408, analysis system 200 determines whether the current event is the last event of the path, after determining that the next event is not a conversion event. For example, if the events are stored in a linked list, and the current event is the last event of the path, the next event would be null, and not a conversion event. In some implementations, the events are stored in different data structures, and step 408 may include reading a header, flag, etc. If the current event is not the last event of the path, process 400 continues with operation 410. If the current event is the last event of the path, process 400 ends with operation 414.

In operation 410, analysis system 200 removes the next event, which is not a conversion event. In some implementations, removing events that are not conversion events following an analyzed event allows an attribution model to efficiently determine whether a path ends in one or more conversion events. In some implementations, events may be removed by redirecting pointers, overwriting locations in memory, etc. In other implementations, events may be removed in any way, and are not limited to those specifically enumerated.

Following operations 410 or 406, process 400 continues with operation 412, in which analysis system 200 advances the current position to the next event. In some implementations, the current position is stored as a value in a local memory. In other implementations, the current position is stored remotely. In yet other implementations, the current position is stored as a pointer, key, etc. After advancing the current indexed position, process 400 returns to step 406 to determine whether the next event is a conversion event. Operations 406, 408, 410, and 412 may be iteratively repeated until the only events left in the paths after the analyzed events are conversion events, at which point the case path generation is complete.

Figure 5:
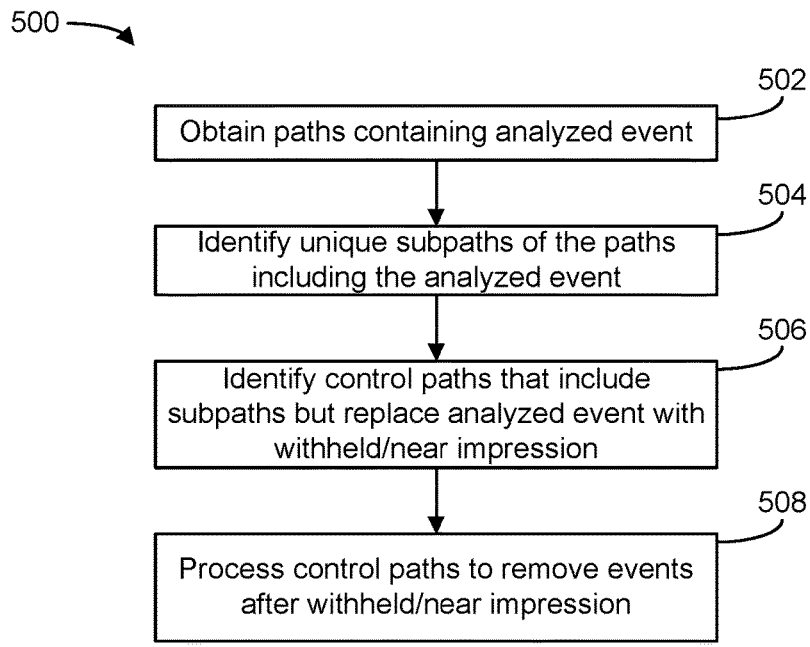
FIG. 5 is a flow diagram of a process for generating control paths of FIG. 3 according to an illustrative implementation.

Referring now to FIG. 5, process 500 for generating control paths is shown, according to an illustrative implementation. Process 500 may be performed by analysis systems 114 or 200 (e.g., control path generator 208).

Process 500 begins with operation 502, in which analysis system 200 obtains paths containing a competing content item impression to the analyzed event (e.g., a near or withheld impression event). Analysis system 200 may receive all available paths and look at each path to determine whether the path contains the competing content item impression. In some implementations, the paths may be pre-filtered to only include paths having the competing content item impression. In other implementations, the paths may be sorted, stored in different locations in memory, etc. to separate the different types of paths.

Analysis system 200 may create control paths for each case path by finding paths that include matching subpaths to subpaths of the case paths (504). For example, if a case path contains events "A," "B," "C," and "D," in that order, and the analyzed event is D, system 200 may look for paths including a sequence of events A, B, C, E, or B, C, E, where E is a withheld or near impression relating to D. In some implementations, analysis system 200 may include only subpaths of events occurring before the analyzed event in the paths, and events occurring after the analyzed event may not be considered (e.g., to reduce any bias that results from an impact of the analyzed event on the occurrence of the future events).

Analysis system 200 may identify control paths from among the path data by identifying paths that include one of the subpaths but in place of the analyzed event instead include a withheld or near impression (506). In the example above, analysis system 200 may identify paths including the series of events ABC, AB, and/or BC. From the identified candidate paths, analysis system 200 may identify control paths where the series of events are followed by a withheld or near impression. A withheld impression may be an impression that would have been selected for presentation to a user but was withheld based on one or more parameters associated with serving the content item (e.g., characteristics of the user, budget parameters, volume/number of times the item can be served within a time period, etc.), and where the analyzed item was instead presented to the user. A near impression may be an impression that was nearly selected for presentation to a user but lost to the analyzed item and was not presented. In some implementations, content management system 108 may provide auction log data to analysis systems 114 and/or 200 from which withheld and/or near impressions for a analyzed item/event can be determined. For example, the auction log data may include data indicating a list of winning items presented to users, a list of items that were excluded from winning due to parameters associated with the items, and/or a list of items that were included in the auction but lost along with data associated with the items (e.g., what position the items finished in the auction, bid data associated with the items in the auction, etc.). The lists may be searched to determine auctions where the analyzed item was selected for presentation, and from those auctions, items that were withheld from selection or narrowly lost the auctions may be identified. Analysis system 200 may process the control paths to remove events after the withheld/near impression (508). For example, in some implementations, all events occurring after the withheld/near impression may be removed except for conversion events (e.g., using a process similar to process 400).

Figure 6:
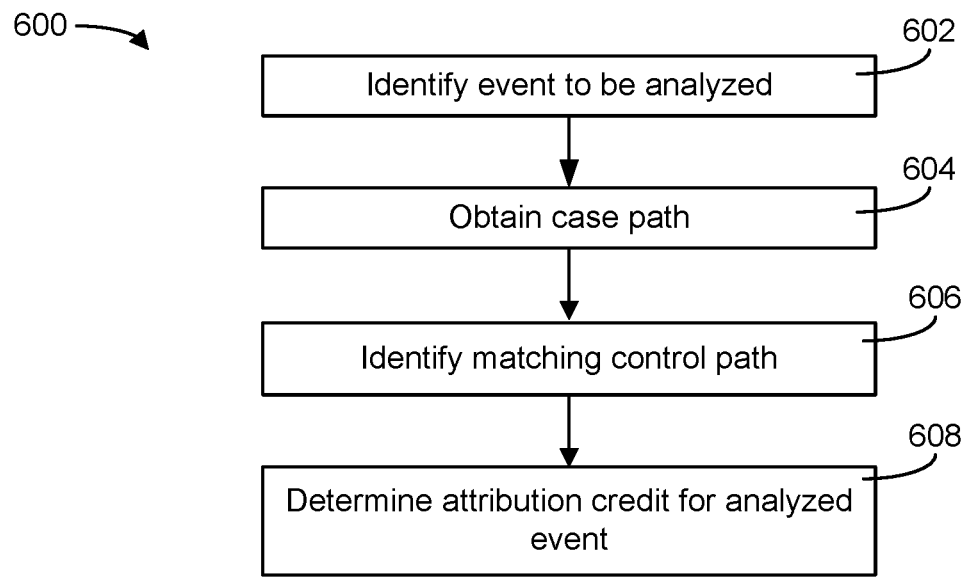
FIG. 6 is a flow diagram of a process for generating an attribution credit for a target event using the analysis system of FIG. 2 according to an illustrative implementation.

Referring now to FIG. 6, a process 600 is shown for determining an attribution credit for an identified analyzed event according to an illustrative implementation. Process 600 may be performed by analysis system 200 (e.g., attribution credit generator 216). Process 600 begins with operation 602, in which analysis system 200 identifies an analyzed event. The analyzed event may be any event occurring within the path data. In some implementations, the analyzed event is a content item impression which is being analyzed.

Process 600 continues with operation 604, in which analysis system 200 obtains one or more case paths including the analyzed event. Analysis system 200 may identify any paths including the analyzed event. In some implementations, analysis system 200 may then process the identified paths to remove one or more events occurring after the analyzed event (e.g., all events except conversions).

Analysis system 200 identifies one or more matching control paths for the case path(s) (606). In some implementations, analysis system 200 identifies more than one control path that corresponds to the obtained case path. For a given case path, control paths may be determined by identifying paths that include a subpath of the events occurring before the analyzed event within the case path, but include a withheld or near impression after the subpath of events instead of the analyzed event.

Process 600 continues with operation 608, in which analysis system 200 determines an attribution credit for the identified analyzed event. In some implementations, analysis system 200 may determine attribution credit for the analyzed event by comparing the conversion metric of a type of case path including the analyzed event with the conversion metric of matching control paths for the case path. In some implementations, if multiple case paths for the item are identified, analysis system 200 may determine an attribution credit for the analyzed event based on a combination (e.g., sum, average, median, etc.) of the individual attribution credits determined for each type of case path.

Figure 7:
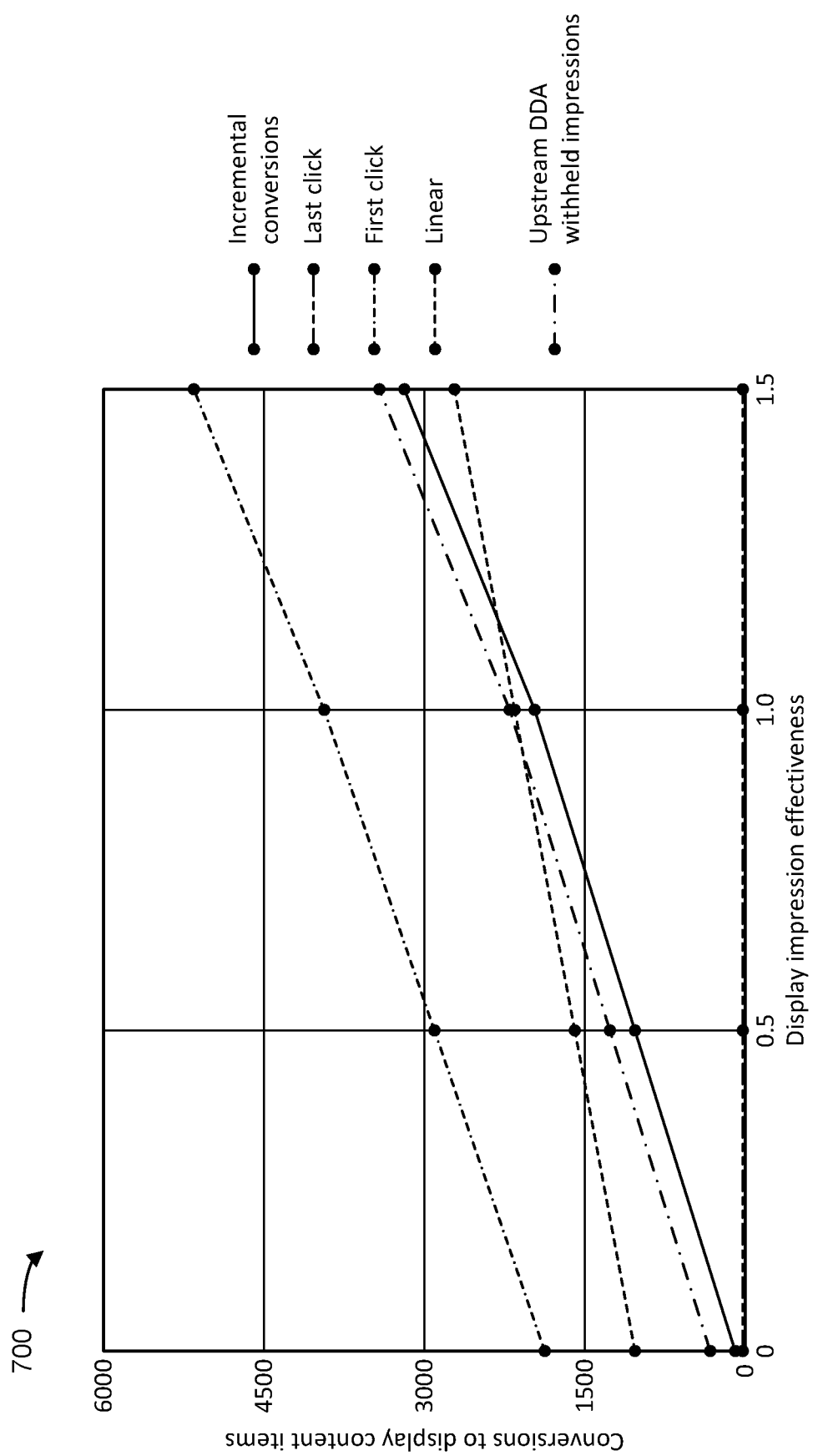
FIG. 7 is a graph representing the effectiveness of the proposed solution relative to existing methods according to an illustrative implementation.

Referring now to FIG. 7, a graph 700 displays conversions attributed to display ads against display content item impression effectiveness, according to one illustrative implementation. Graph 700 includes data from a simulated series of data sets with varied levels of display content item impression effectiveness. Each data set was used in a randomized experiment to determine the true incremental conversion rate from display ads at each effectiveness level. In this illustrative implementation, the results were compared to conversions attributed to display ads from existing attribution models and an illustrative implementation of the proposed solution.

Graph 700 shows that results from the proposed solution are closest in trend and value to results from the determined true incremental conversion rate. The illustrative implementation of the features discussed herein, under this experiment, more accurately modeled the actual impact of the display impressions than other existing models (e.g., last click, first click, and linear).

Figure 8:
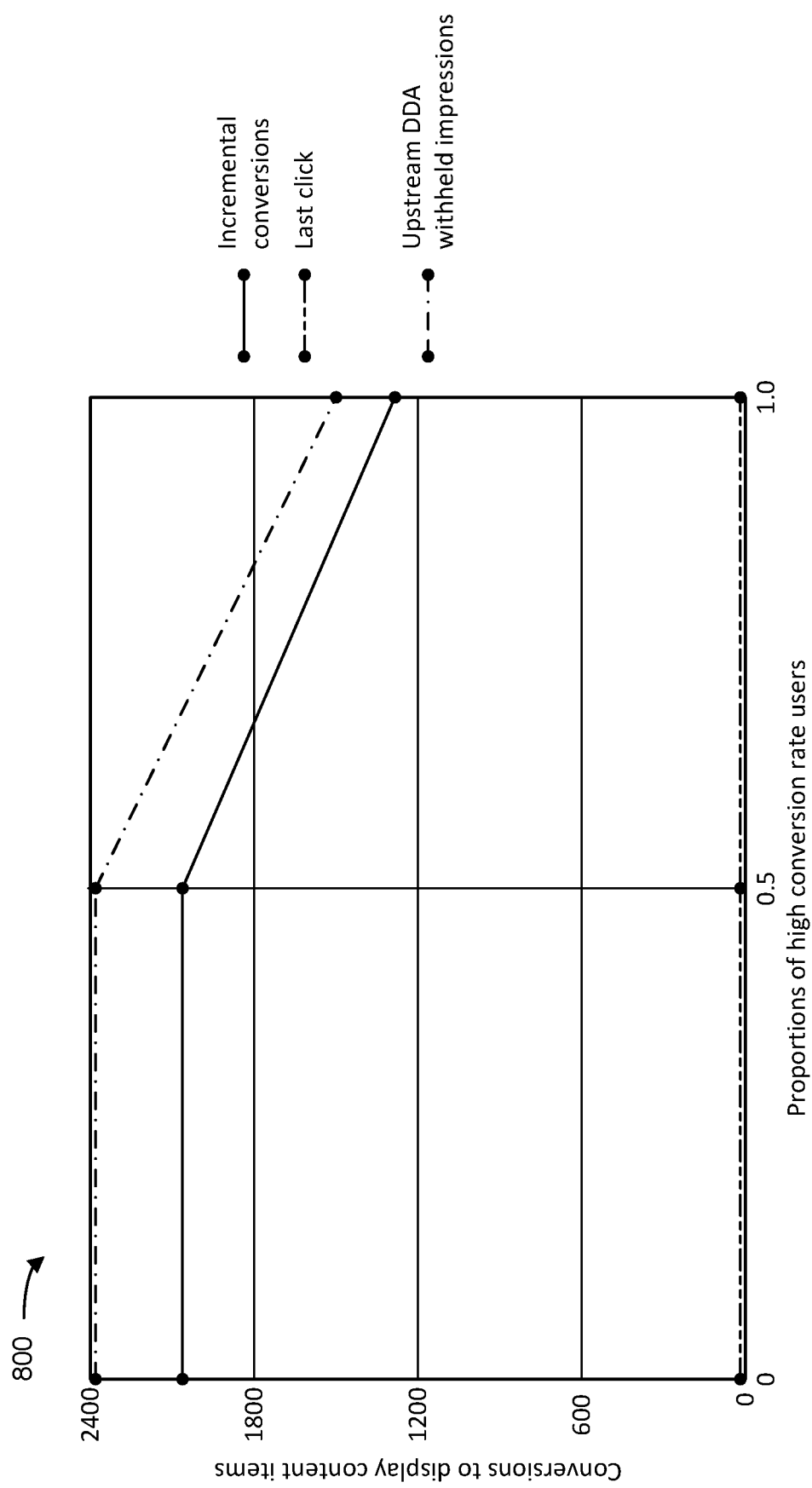
FIG. 8 is a graph representing the effectiveness of the proposed solution relative to existing methods according to another illustrative implementation.

Referring now to FIG. 8, a graph 800 displays conversions attributed to display ads against the proportion of high conversion rate users, according to an illustrative implementation. Graph 800 includes data from a simulated series of data sets with heterogeneous users to reflect a user targeting scenario. In this particular example, a simulation was performed in which each user had either a high or low conversion rate (e.g., probability of conversion given a visit to the content provider's website).

The proportion of users with high conversion rates was then varied in the simulated data sets. In this example, content items were targeted to half of the users. Specifically, in the data set having 25% high conversion rate users, items targeted all users with high conversion rates and 33% of users having low conversion rates. In the data set having 50% high conversion rate users, items targeted all users with high conversion rates and no users with low conversion rates. In the data set having 75% high conversion rate users, items targeted 67% of users with high conversion rates and no users with low conversion rates. Graph 800 shows that results from the proposed solution again outperform results from existing models (e.g., last click). The proposed solution provided results that were closest to the true incremental conversions in trend and value.

Figure 9:
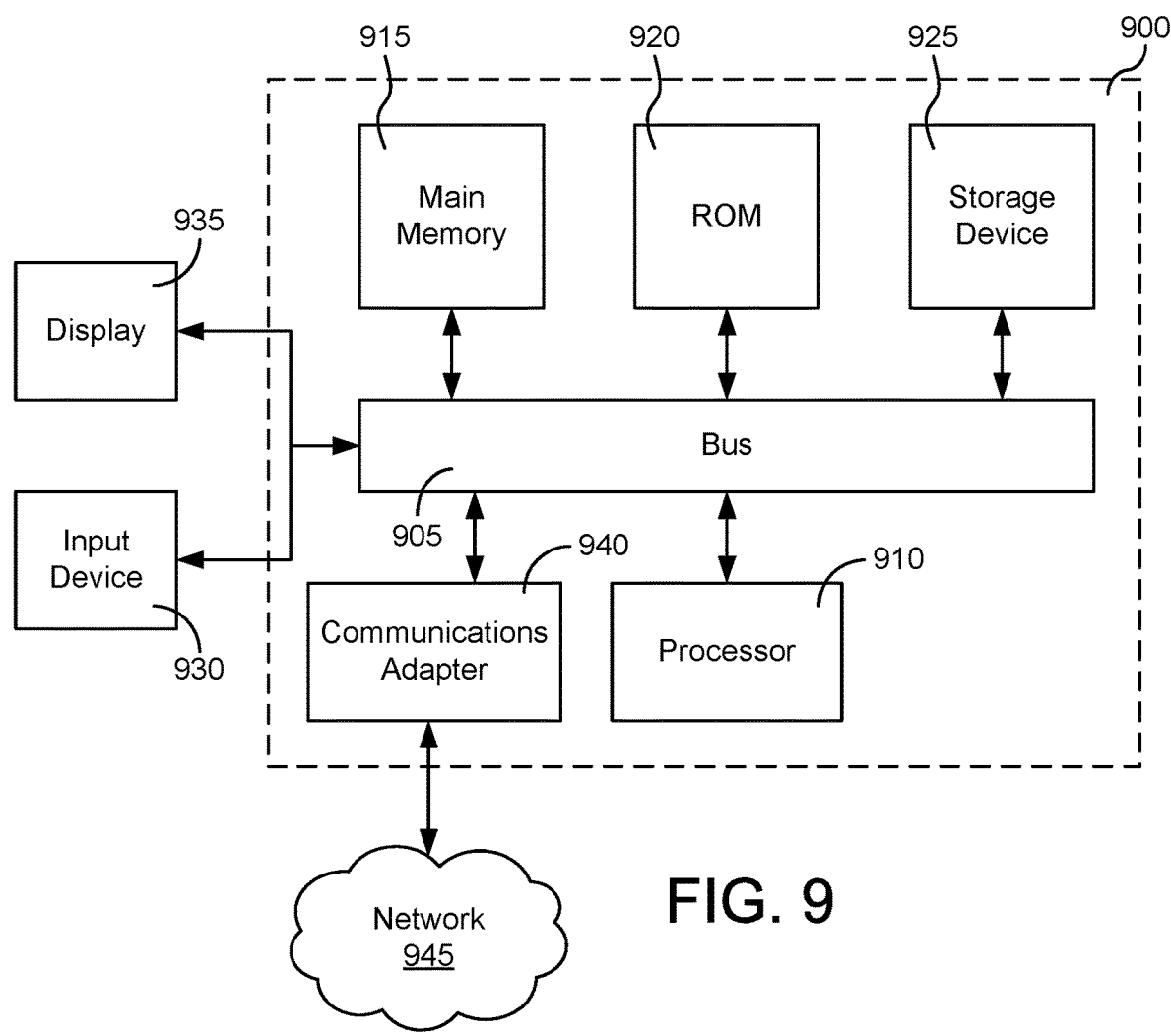
FIG. 9 is a block diagram of a computing system according to an illustrative implementation.

FIG. 9 illustrates a depiction of a computer system 900 that can be used, for example, to implement an illustrative user device 104, an illustrative content management system 108, an illustrative content provider device 106, an illustrative analysis system 114, and/or various other illustrative systems described in the present disclosure. The computing system 900 includes a bus 905 or other communication component for communicating information and a processor 910 coupled to the bus 905 for processing information. The computing system 900 also includes main memory 915, such as a random access memory (RAM) or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a read only memory (ROM) 920 or other static storage device coupled to the bus 905 for storing static information and instructions for the processor 910. A storage device 925, such as a solid state device, magnetic disk or optical disk, is coupled to the bus 905 for persistently storing information and instructions.

The computing system 900 may be coupled via the bus 905 to a display 935, such as a liquid crystal display, or active matrix display, for displaying information to a user. An input device 930, such as a keyboard including alphanumeric and other keys, may be coupled to the bus 905 for communicating information, and command selections to the processor 910. In another implementation, the input device 930 has a touch screen display 935. The input device 930 can include a cursor control, such as a mouse, a trackball, or cursor direction keys, for communicating direction information and command selections to the processor 910 and for controlling cursor movement on the display 935.

In some implementations, the computing system 900 may include a communications adapter 940, such as a networking adapter. Communications adapter 940 may be coupled to bus 905 and may be configured to enable communications with a computing or communications network 945 and/or other computing systems. In various illustrative implementations, any type of networking configuration may be achieved using communications adapter 940, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. In alternative implementations, hard-wired circuitry may be used in place of or in combination with software instructions to implement illustrative implementations. Thus, implementations are not limited to any specific combination of hardware circuitry and software.

Although an example processing system has been described in FIG. 9, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example, semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

determining, by one or more processors, for a first content item impression, a competing content item that participated in a first plurality of content auctions for a first plurality of users in which the first content item was a participant, wherein the competing content item is a non-served item of a first type withheld from presentation to the first plurality of users through the first plurality of content auctions or a second type within a threshold level from selection as a winning participant in the first plurality of content auctions, wherein the first plurality of users share one or more common characteristics with a second plurality of users indicated by the competing content item being the non-served item of the first plurality of content auctions and being a winning participant of a second plurality of content auctions associated with a plurality of second paths;

identifying, by the one or more processors, a plurality of first paths associated with the first plurality of users including a sequence of events, the sequence of events including an interaction with the first content item impression;

identifying, by the one or more processors, the plurality of second paths associated with the second plurality of users, each of the plurality of second paths including the sequence of events with an interaction with an impression of the competing content item in place of the first content item impression in the sequence of events;

determining, by the one or more processors, a first conversion metric for the first paths and a second conversion metric for the second paths;

comparing, by the one or more processors, the first conversion metric with the second conversion metric to determine an attribution credit for the first content item impression; and storing the determined attribution credit.

2. The method of claim 1, wherein determining the attribution credit comprises determining the attribution credit for the sequence of events including the first content item impression using the comparison of the first conversion metric and the second conversion metric.

3. The method of claim 1, wherein the first conversion metric and the second conversion metric each comprise at least one of:
 a ratio of paths including a conversion to at least one of paths excluding a conversion or total paths;
 a conversion rate; or
 an average number of conversions per path.

4. The method of claim 1, further comprising:
 determining a plurality of different types of the first paths, each type of first path including a different sequence of events including the interaction with the first content item impression;
 determining, for each of the different types of first paths, a matching set of second paths including the corresponding sequence of events;
 determining, for each type of first path, the first conversion metric for the first paths of the respective type and the second conversion metric for the matching second paths;
 determining, for each type of first path, an attribution credit for the type of first path by comparing the first conversion metric for the type of first path with the second conversion metric for the matching second paths; and
 determining an aggregated conversion metric for the first content item impression based on a combination of the attribution credits for each of the different types of first paths.

5. The method of claim 4, wherein the aggregated conversion metric comprises a weighted average of the attribution credits for the different types of first paths, wherein each attribution credits is weighted based on an amount of paths of the type of first path associated with the attribution credit.

6. The method of claim 1, wherein the threshold level of the second type of competing content item comprises at least one of a threshold number of bids, a threshold bid amount, a threshold quality score, or a threshold value based on a combination of the bid amount and the quality score, wherein the quality score is based on one or more parameters associated with the competing content item.

7. The method of claim 1, wherein identifying the first paths comprises:
 identifying a set of paths that include the sequence of events, wherein the sequence of events ends with the first content item impression;
 identifying one or more first conversion events having index positions temporally after an index position of the first content item impression; and
 retaining the one or more first conversion events and discarding other events having index positions temporally after the index position of the first content item impression to generate the first paths.

8. The method of claim 7, wherein identifying the second paths comprises:
 identifying a set of paths that include the sequence of events with an impression of the competing content item in place of the first content item at the end of the sequence of events;
 identifying one or more second conversion events having index positions temporally after an index position of the impression of the competing content item; and
 retaining the one or more second conversion events and discarding other events having index positions temporally after the index position of the impression of the competing content item to generate the second paths.

9. A system, comprising:
 at least one processor operably coupled to at least one memory and configured to:
  determine for a first content item impression, a competing content item that participated in a first plurality of content auctions for a first plurality of users in which the first content item was a participant, wherein the competing content item is a non-served item of a first type withheld from presentation to the first plurality of users through the first plurality of content auctions or a second type within a threshold level from selection as a winning participant in the first plurality of content auctions, wherein the first plurality of users share one or more common characteristics with a second plurality of users indicated by the competing content item being the non-served item of the first plurality of content auctions and being a winning participant of a second plurality of content auctions associated with a plurality of second paths;
  identify a plurality of first paths associated with the first plurality of users including a sequence of events, the sequence of events including an interaction with the first content item impression;
  identify the plurality of second paths associated with the second plurality of users, each of the plurality of second paths including the sequence of events with an interaction with an impression of the competing content item in place of the first content item impression in the sequence of events;
  determine a first conversion metric for the first paths and a second conversion metric for the second paths;
  compare the first conversion metric with the second conversion metric to determine an attribution credit for the first content item impression; and
  store the determined attribution credit.

10. The system of claim 9, wherein the at least one processor is further configured to attribute the attribution credit to the sequence of events including the first content item impression.

11. The system of claim 9, wherein the at least one processor is configured to:
 determine a plurality of different types of the first paths, each type of first path including a different sequence of events including the interaction with the first content item impression;
 determine, for each of the different types of first paths, a matching set of second paths including the corresponding sequence of events;
 determine, for each type of first path, the first conversion metric for the first paths of the respective type and the second conversion metric for the matching second paths;
 determine, for each type of first path, an attribution credit for the type of first path by comparing the first conversion metric for the type of first path with the second conversion metric for the matching second paths; and determine an aggregated conversion metric for the first content item impression based on a combination of the attribution credits for each of the different types of first paths.

12. The system of claim 11, wherein the aggregated conversion metric comprises a weighted average of the attribution credits for the different types of first paths, wherein each attribution credits is weighted based on an amount of paths of the type of first path associated with the attribution credit.

13. The system of claim 9, wherein the threshold level of the second type of competing content item comprises at least one of a threshold number of bids, a threshold bid amount, a threshold quality score, or a threshold value based on a combination of the bid amount and the quality score, wherein the quality score is based on one or more parameters associated with the competing content item.

14. The system of claim 9, wherein the at least one processor is configured to identify the first paths by:
    identifying a set of paths that include the sequence of events, wherein the sequence of events ends with the first content item impression;
    identifying one or more first conversion events having index positions temporally after an index position of the first content item impression; and
    retaining the one or more first conversion events and discarding other events having index positions temporally after the index position of the first content item impression to generate the first paths.

15. The system of claim 14, wherein the at least one processor is configured to identify the second paths by:
    identifying a set of paths that include the sequence of events with an impression of the competing content item in place of the first content item at the end of the sequence of events;
    identifying one or more second conversion events having index positions temporally after an index position of the impression of the competing content item; and
    retaining the one or more second conversion events and discarding other events having index positions temporally after the index position of the impression of the competing content item to generate the second paths.

16. One or more computer-readable storage media having instructions stored thereon that, when executed by one or more processors, cause the one or more processors to execute operations comprising:
    determining, by one or more processors, for a first content item impression, a competing content item that participated in a first plurality of content auctions for a first plurality of users in which the first content item was a participant, wherein the competing content item is a non-served item of a first type withheld from presentation to users through the first plurality of content auctions or a second type within a threshold level from selection as a winning participant in the first plurality of content auctions, wherein the first plurality of users share one or more common characteristics with a second plurality of users indicated by the competing content item being the non-served item of the first plurality of content auctions and being a winning participant of a second plurality of content auctions associated with a plurality of second paths;
    identifying a plurality of first paths associated with the first plurality of users including the first content item impression at an index position within each of the first paths, each of the first paths including a sequence of events occurring prior to the index position;
    identifying the plurality of second paths associated with the second plurality of users, each of the plurality of second paths including the sequence of events prior to the index position and including the competing content item impression at the index position;
    determining, by the one or more processors, a first conversion metric for the first paths and a second conversion metric for the second paths;
    comparing the first conversion metric with the second conversion metric to determine an attribution credit for the first content item impression; and
    storing the determined attribution credit in association with the first paths including the sequence of events and the first content item impression.

17. The one or more computer-readable storage media of claim 16, the operations further comprising:
    determining a plurality of different types of the first paths, each type of first path including a different sequence of events prior to the interaction with the first content item impression;
    determining, for each of the different types of first paths, a matching set of second paths including the corresponding sequence of events;
    determining, for each type of first path, the first conversion metric for the first paths of the respective type and the second conversion metric for the matching second paths;
    determining, for each type of first path, an attribution credit for the type of first path by comparing the first conversion metric for the type of first path with the second conversion metric for the matching second paths; and
    determining an aggregated conversion metric for the first content item impression based on a combination of the attribution credits for each of the different types of first paths.

18. The one or more computer-readable storage media of claim 17, wherein the aggregated conversion metric comprises a weighted average of the attribution credits for the different types of first paths, wherein each attribution credits is weighted based on an amount of paths of the type of first path associated with the attribution credit.

19. The one or more computer-readable storage media of claim 16, wherein identifying the first paths comprises:
    identifying a set of paths that include the sequence of events prior to the index position and the first content item impression at the index position;
    identifying one or more first conversion events having index positions temporally after the index position of the first content item impression; and
    retaining the one or more first conversion events and discarding other events having index positions temporally after the index position of the first content item impression to generate the first paths.

20. The method of claim 7, wherein identifying the second paths comprises:
    identifying a set of paths that include the sequence of events prior to the index position and an impression of the competing content item at the index position;
    identifying one or more second conversion events having index positions temporally after the index position of the impression of the competing content item; and
    retaining the one or more second conversion events and discarding other events having index positions temporally after the index position of the impression of the competing content item to generate the second paths.

* * * * *